(12) United States Patent
Liberty

(10) Patent No.: US 6,275,900 B1
(45) Date of Patent: Aug. 14, 2001

(54) HYBRID NUMA/S-COMA SYSTEM AND METHOD

(75) Inventor: Dean A. Liberty, Palenville, NY (US)

(73) Assignee: International Business Machines Company, Armonk, NY (US)

(*) Notice: Subject to any disclaimer, the term of this patent is extended or adjusted under 35 U.S.C. 154(b) by 0 days.

(21) Appl. No.: 09/238,203

(22) Filed: Jan. 27, 1999

(51) Int. Cl.[7] .............................. G06F 12/08; G06F 12/10
(52) U.S. Cl. ..................... 711/120; 711/124; 711/141; 711/148; 711/209
(58) Field of Search .................................. 711/120, 124, 711/141, 144, 145, 146, 148, 153, 1, 5, 203, 206, 209

(56) References Cited

U.S. PATENT DOCUMENTS

| | | | |
|---|---|---|---|
| 4,754,394 | 6/1988 | Brantley, Jr. et al. | 711/5 |
| 5,117,350 | 5/1992 | Parrish et al. | 711/1 |
| 5,237,673 | 8/1993 | Orbits et al. | 711/170 |
| 5,535,116 | 7/1996 | Gupta et al. | 700/5 |
| 5,588,138 | 12/1996 | Bai et al. | 711/173 |
| 5,592,671 | 1/1997 | Hirayama | 709/104 |
| 5,682,512 | 10/1997 | Tetrick | 711/202 |
| 5,710,907 | 1/1998 | Hagersten et al. | 711/148 |
| 5,878,268 * | 3/1999 | Hagersten | 712/28 |
| 5,893,922 * | 4/1999 | Baylor et al. | 711/148 |
| 5,926,829 * | 7/1999 | Hagersten et al. | 711/120 |
| 5,937,431 * | 8/1999 | Kong et al. | 711/145 |
| 6,012,127 * | 1/2000 | McDonald et al. | 711/141 |
| 6,085,295 * | 7/2000 | Ekanadham et al. | 711/145 |

OTHER PUBLICATIONS

Gregory F. Pfister, "In Search of Clusters—Second Edition", Prentice Hall PTR (1998), pp. 132–173; Chapter 7 "NUMA and Friends", pp. 185–215.

* cited by examiner

*Primary Examiner*—Do Hyun Yoo
*Assistant Examiner*—Gary J. Portka
(74) *Attorney, Agent, or Firm*—Floyd A. Gonzalez, Esq.; Lawrence D. Cutter, Esq.; Heslin & Rothenberg, P.C.

(57) ABSTRACT

A hybrid non-uniform-memory-architecture/simple-cache-only-memory-architecture (NUMA/S-COMA) memory system and method are described useful in association with a computer system having a plurality of nodes coupled to each other. The plurality of nodes include NUMA memory which are configured to store data lines. The NUMA memories include a NUMA coherence subsystem for coordinating transfer of data between the nodes. At least one S-COMA cache is provided on at least one node of the computer system. The at least one S-COMA cache is configured to employ the NUMA coherence subsystem in sending data communication to or receiving data communication from another node of the plurality of nodes of the computer system. Data stored at another node of the system is accessed using a home node real address as the network address. The home node real address is translated into a local real address at the client node using a boundary function translation table. The NUMA coherence subsystem is employed by the S-COMA cache to provide data reference capture, data movement and coherence mechanisms, thereby avoiding the need for a separate S-COMA coherence mechanism to accomplish these functions.

18 Claims, 9 Drawing Sheets

HYBRID NUMA/S-COMA SYSTEM AND METHOD

TECHNICAL FIELD

The present invention relates to the field of distributed shared memory systems and caches. More particularly, the invention relates to a hybrid architecture wherein a first type of memory (simple COMA) is built atop and integral with another type of memory (NUMA).

DEFINITIONS

The following terms are used in this document:

Global Memory: Refers to memory objects which are addressable by processes on different nodes. Created and attached in a UNIX System V like way, and attached into the effective address space of each process which wants to address the global memory object.

DSM: Distributed Shared Memory. A class of architectures which provide the function of shared memory, even though the physical memory is distributed among nodes in the system.

S-COMA: Simple Cache Only Memory Architecture. A DSM scheme in which each node reserves a portion of its local memory to be used as a cache for global memory. This cache is managed through a combination of S-COMA software and hardware. Processes reference the data through process specific virtual addresses, node memory hardware references the data through local real addresses, and S-COMA hardware passes global addresses between nodes. The S-COMA subsystem takes care of translating between local real addresses and global addresses.

NUMA: Non Uniform Memory Access. A DSM scheme in which each of the n nodes in a system holds 1/n of the real memory (and real address space) of the system. Processes reference data through the virtual address, and node memory hardware references data through the real address. The NUMA infrastructure passes real addresses between nodes.

UMA: Uniform Memory Access. A shared memory organization whereby any processor can reference any memory location in equal (uniform) time.

Boundary Function (BF): A layer or logical function which performs a set of actions at the boundary of a node. In this invention, the BF performs address translation for addresses entering or leaving a node through the DSM subsystem.

Client: A node which references (caches) data, but is not the home for the data.

Home: A node which is the owner of the data or the owner of the directory which manages the data coherence.

Latency: The delay associated with a particular action or operation, such as fetching data from memory.

Snooping logic: Logic which monitors (snoops) a line or bus, looking for particular addresses, tags, or other key information.

Network logic: Logic which interfaces to a network or communication fabric.

Real address space: The range of real addresses generated by address translation. The addresses of the physical memory.

Local real address: A real address which applies to a local node.

Global real address: A real address which applies to all nodes.

Physical address: A real address. The address of physical memory.

Input address: The address provided as input to a component.

Associated address: In a data structure which consists of pairs of addresses, the second address of the pair, the first address being the input address.

BACKGROUND OF THE INVENTION

Shared memory multiprocessor systems allow each of multiple processors to reference any storage location (memory) in the system through read and write (load and store) operations. The underlying structure of the shared memory is hidden from the processors, or programs, except insofar as performance is concerned.

A single memory location may be updated by multiple processors. The result is a single sequence of updates, and all processors see the updates to that memory location in the same order. This property is known as "coherence". On a coherent system, no processor can see a different order of updates than another processor.

Cache coherent, shared memory multiprocessor systems provide caches to the memory structure in order to improve performance (reduce latency) of memory accesses. Because the caches are kept coherent, the characteristic of a single sequence of updates for a given memory location, as seen by all processors in the system, is maintained.

The system architectures discussed in this patent are cache coherent, shared memory multiprocessor systems. Three specific variations of these systems are described below, namely, UMA, NUMA, and S-COMA.

"UMA" refers to Uniform Memory Access, and describes a system architecture wherein multiple processors in a computer system share a real address space, and the memory latency from any processor to any memory location is the same or uniform. That is, a given processor can reference any memory location in uniform time. Most modern symmetric multi-processors (SMP) are UMA systems. FIG. 1 shows a typical UMA system 10 configuration. A number of processors 12 are connected to a common system bus 14, as is a memory 16. Because the path from any processor 12 to any location in memory 16 is the same (i.e., across the system bus), the latency from any processor to any memory location is the same.

FIG. 1 also shows caches 18. There must be a cache coherence protocol which manages caches 18 and ensures that updates to a single memory location are ordered, so that all processors will see the same sequence of updates. In UMA systems, such as the one depicted, this is frequently accomplished by having each cache controller "snoop" on the system bus. This involves observing all transactions on the bus, and taking action (i.e., participating in the coherence protocol) when an operation on the bus refers to a memory location which is being held in the snooper's cache.

The benefit in this type of organization is that parallel programming is simplified, in that processes can be less sensitive to data placement; i.e., data can be accessed in a particular amount of time, regardless of the memory location used to hold the data.

The drawback of this type of organization is that UMA systems do not scale well. As larger and larger systems are designed (with more and more processors and memory), it becomes increasingly difficult and costly to maintain the uniformity of memory access times. Furthermore, schemes which require cache controllers to snoop require a common communications medium, such as a common system bus, for data addresses. However, the system bus is a serial resource which becomes overloaded as more processors and more memory operations are placed on it. When the system bus is saturated, the addition of more or faster processors does not improve system performance.

A further system variation is "NUMA", which refers to Non-Uniform Memory Access, and describes a system architecture wherein multiple processors in a computer system share a real address space where memory latency varies depending on the memory location being accessed. That is, some memory locations are "closer" to some processors than to others. Unlike an UMA system, all memory locations are not accessible from a given processor in equal time; i.e., some memory locations take longer to access than others, hence memory access times are non-uniform.

As shown in FIG. 2, a NUMA system implements distributed shared memory; i.e., the total system memory is the sum of memories $M_1, M_2, M_3$ in nodes 22. There is a single real address space which is shared by all the nodes 22 in the system 20 and, in FIG. 2, each node contains one third of the system memory. Each node 22 includes an UMA system 10. A number of nodes are connected to a common communications fabric or network 24, each through a Network Interface (NI) 26.

A processor in one node may access a memory location in another node via a load or store instruction. The NUMA Memory Controller (NMC) 28 function is responsible for capturing the memory request on the local node's system bus and forwarding it to the node which contains the target memory location (i.e., the home node). Because the path from one processor to a remote memory location is further than the path from the same processor to a local memory location, the memory access times are non-uniform.

As with the UMA system, caches are kept coherent through some protocol. All processors on all nodes will see updates to a single memory location as serialized. However, unlike UMA systems, NUMA systems typically do not broadcast memory operations to all nodes so that all cache controllers can snoop on them. Instead, the home node NMC is responsible for forwarding coherence requests to the remote nodes which would be interested in them. In typical NUMA implementations, each NMC maintains a directory for all of the memory in its node. This directory tracks each cache line of local memory, keeping the state of the line and an awareness of which other nodes are caching the line. For example, NMC 28 in Node 1 tracks all of the memory in $M_1$. If a memory operation occurs on Node 1, NMC 28 on Node 1 consults its directory, and may forward the request to all nodes which have the target line cached. A sample data flow for remote memory access in a NUMA system is well described in U.S. Pat. No. 5,710,907, entitled: "Hybrid NUMA COMA Caching System and Methods for Selecting Between the Caching Modes", the entirety of which is hereby incorporated herein by reference.

The benefit of such an architecture is that it is easier to build a system which scales beyond the limitations of an UMA system. The primary reason for this is that all cache controllers do not have to snoop on a single, common communications fabric. Instead, they snoop only on a local fabric, which sees memory operations only when they affect that node.

The drawback of a NUMA system is that performance sensitive programs will perform differently depending on where data is placed in memory. This is particularly critical for parallel programs, which may share data between many threads of execution of the program.

A secondary problem, which exacerbates the increased memory latency of the distributed memory, is the limited cache sizes of NUMA systems. Some NUMA systems do not provide greater caching capabilities than the SMPs out of which they may be built, in which case the increased memory latency lessens the benefit of the hardware caches. Alternatively, another level of hardware caching can be provided, possibly in the NMC. However, this tends to be dedicated hardware, which means an expense which becomes practical only when a large number of accesses to remote memory exists.

As a further system variation, "S-COMA" refers to Simple Cache Only Memory Architecture (i.e., a variant of COMA, the Cache Only Memory Architecture), and describes a distributed shared memory architecture wherein multiple processors in a computer system can transparently access any memory in the complex, and memory latency varies depending on the memory location being accessed. However, unlike NUMA systems, nodes maintain independent real address spaces. A portion of the local real memory of each node is used as a cache, allocated in page sized chunks by system software. The specifics of S-COMA operation are well described in the above-incorporated U.S. Pat. No. 5,710,907.

One benefit of such an architecture is that it is easy to build a system which scales better than UMA or NUMA. The primary reason for this is that each node manages only its local real memory space, reducing system complexity and internode interference. Also, as with NUMA, all cache controllers do not have to snoop on a single, common communications fabric. Instead, they snoop only on a local fabric, which sees memory operations only when they affect that node.

Additionally, S-COMA provides better average latency than NUMA for many programs by providing very large main memory caches. Because much larger caches are provided, the number of cache misses, and therefore remote memory accesses, can be greatly reduced, thereby improving program performance. In addition, S-COMA provides better scalability and node isolation characteristics than NUMA by reducing contention for memory management data structures. It also limits direct memory access from remote nodes by filtering addresses through a translation function.

Referring to FIG. 3, with S-COMA architecture a global memory object is created and allocated a global address (GA), and a single node is designated the home node 30 for any particular data page. The global object is attached to each interested process' address space by assigning the object a virtual address (VA). This VA is subsequently translated using page tables (PT) into a local real address (RA).

Each node 30, 32 maintains an S-COMA cache 34; i.e., a cache in main memory 36 which is maintained by the S-COMA subsystem. When the global data area is referenced, a slot in the S-COMA cache is allocated, and the data is made memory resident in the home node 30 by placing it in the home node's S-COMA cache 34. The S-COMA apparatus on the home 30 is primed to associate the home S-COMA cache line 34 address (RA) with the target line's global address (GA). The S-COMA apparatus on the client node 32 is primed to associate the client S-COMA cache line 34 address (RA') with the target line's global address.

When a client 32 attempts to reference global data which is not in the local L2 cache, the client's S-COMA cache 34 is checked. If the data is available there, the data is fetched from local memory (RA') and the request is finished. If the data is not present or is not in a valid state in the client's S-COMA cache 34, then the client's S-COMA dir.' 38 communicates with the home S-COMA dir. 38 to retrieve a valid copy of the data.

At each node of the internode communication, the S-COMA mechanism performs a boundary function, translating the relevant local real address (RA), (RA') of the S-COMA cache slot to a global address (GA). Note that each node 30, 32 can utilize a different real address for the target line's S-COMA cache slot, but all use the same global address for identifying a particular global line. In this way, independence is maintained between nodes.

An S-COMA caching system suffers the drawback of allocating cache slots in page increments, although coherence is performed on a cache line basis. If a process uses a large percentage of the memory in each page allocated in the S-COMA cache, S-COMA can provide advantages over NUMA by providing a great deal more caching capacity. However, if relatively little of each allocated page is used, then S-COMA wastes memory by allocating large cache slots which are inefficiently used.

As a further variation, a hybrid caching architecture together with a cache-coherent protocol for a multi-processor computer system is described in the above-incorporated U.S. Letters Patent No. 5,710,907 entitled "Hybrid NUMA COMA Caching System and Methods for Selecting Between the Caching Modes." In one implementation of this hybrid system, each subsystem includes at least one processor, a page-oriented COMA cache and a line-oriented hybrid NUMA/COMA cache. Each subsystem is able to independently store data in COMA mode or in NUMA mode. When caching in COMA mode, a subsystem allocates a page of memory space and then stores the data within the allocated page in its COMA cache. Depending on the implementation, while caching in COMA mode, the subsystem may also store the same data in its hybrid cache for faster access. Conversely, when caching in NUMA mode, the subsystem stores the data, typically a line of data, in its hybrid cache.

One drawback to the above-summarized hybrid system is that the system relies on an S-COMA coherence apparatus which is independent of and equal to a NUMA coherence apparatus. Two logically complete apparatuses are employed to implement the hybrid concepts described therein. Furthermore, both home and client nodes must maintain S-COMA caches for data and translate between global addresses and real addresses.

Notwithstanding existence of the above-summarized system variations, further enhancements to system memory architecture and in particular, to a hybrid architecture employing a first type of memory and a second type of memory are desired.

DISCLOSURE OF THE INVENTION

Briefly summarized, in one aspect this invention comprises a hybrid non-uniform memory architecture/simple-cache-only-memory-architecture (NUMA/S-COMA) memory system useful in association with a computer system having a plurality of nodes coupled to each other, wherein data is stored in the hybrid NUMA/S-COMA memory system as a plurality of pages, with each page including at least one data line. The hybrid NUMA/S-COMA memory system includes a plurality of NUMA memories configured to store the at least one data line. Each NUMA memory of the plurality of NUMA memories resides at a different node of the plurality of nodes of the computer system. The plurality of NUMA memories includes a NUMA coherence subsystem for coordinating transfer of data between the NUMA memories. The hybrid NUMA/S-COMA memory system further includes at least one S-COMA cache in NUMA memory configured to store at least one of the plurality of pages. Each S-COMA cache resides at a different node of the plurality of nodes of the computer system. The at least one S-COMA cache employs the NUMA coherence subsystem in receiving data from or transferring data to another node of the plurality of nodes of the computer system.

In another aspect, the invention comprises a method for communicating data between a client node and a home node of a computer system having a plurality of nodes coupled to each other, wherein the computer system employs a hybrid non-uniform-memory architecture/simple-cache-only memory architecture (NUMA/S-COMA) memory system having a plurality of NUMA memories configured to store data, each NUMA memory residing at a different node of the computer system, and at least one S-COMA cache configured to store data, each S-COMA cache residing at a different node of the computer system, the client node including an S-COMA cache of the at least one S-COMA cache. The communication method includes: generating at the client node of the plurality of nodes of the computer system a data request with a real address of memory; determining whether the real address comprises a local real address at the client node; when the real address comprises a local real address, determining whether a boundary function translation is required of the local real address to translate the local real address into a home node real address; and when the boundary function translation is required, translating the local real address into the home node real address, wherein the home node real address comprises a network address to be employed by the client node in requesting access to data at the home node real address.

In a further aspect, the invention comprises a method for fabricating a hybrid non-uniform-memory-architecture/simple-cache-only-memory-architecture (NUMA/S-COMA) memory system. The method includes: providing a computer system having a plurality of nodes coupled to each other; configuring the computer system with a non-uniform memory access (NUMA) architecture, the NUMA architecture including a NUMA coherence subsystem; and building a simple-cache only memory architecture (S-COMA) cache at at least one node of the plurality of nodes of the computer system, the building of the S-COMA cache comprising configuring the S-COMA cache for data reference capture, data movement and coherence management using the NUMA coherence subsystem without employing an S-COMA coherence subsystem.

In a still further aspect, the invention comprises an article of manufacture which includes at least one computer usable medium having computer readable program code means embodied therein for causing communicating of data between a client node and a home node of a computer system having a plurality of nodes coupled to each other, wherein the computer system employs a hybrid non-uniform-memory architecture/simple-cache-only-memory-architecture (NUMA/S-COMA) memory system having a plurality of NUMA memories configured to store data, each NUMA memory residing at a different node of the computer system, and at least one S-COMA cache configured to store data, each S-COMA cache residing at a different node of the computer system, the client node including an S-COMA cache of the at least one S-COMA cache. The computer readable program code means in the article of manufacture comprising: computer readable program code means for causing a computer to effect generating at the client node of the plurality of nodes a data request with a real address of memory; computer readable program code means for causing a computer to effect determining whether the real address comprises a local real address at the client node; computer readable program code means for causing a computer to effect determining whether a boundary function translation is required when the real address comprises a local real address, the boundary function translation translating the local real address into a home node real address; and computer readable program code means for causing a computer to effect translating the local real address into the home node real address when the boundary function translation is required, wherein the home node real address comprises a network address to be employed by the client node in requesting access to data at the home node real address.

There are numerous advantages to a hybrid NUMA/S-COMA system as disclosed herein. With a truly merged system as presented, the need for separate S-COMA coherence and communication apparatus and separate NUMA coherence and communication apparatus is avoided. As disclosed herein, the NUMA director is employed to move data and maintain internode coherence notwithstanding integration of the S-COMA function therewith. With a combined system as presented herein, the large, flexible, main memory caches of S-COMA are available, which provides extra caching capacity (over a purely NUMA implementation) for each node without requiring dedicated cache memory. The hybrid system implemented in accordance with this invention should attain very high performance for an S-COMA implementation, leveraging the optimized NUMA mechanism and avoiding a translation between global addresses and real addresses on the home node.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

The present invention provides a method for building a Simple Cache Only Memory Architecture (S-COMA) system on top of a Non-Uniform Memory Access (NUMA) infrastructure, utilizing the NUMA coherence apparatus for data reference capture, data movement, and coherence management. As per the S-COMA organization, a portion of main memory on each node is used as a data cache for global memory. Each of these S-COMA caches are managed by the local node which uses them.

With this invention, each node which caches data from a home node is able to cache data in the normal NUMA hierarchy and optionally, to cache the data in S-COMA caches independent of each other and without special knowledge by the home node of their caching decision.

This is accomplished by using the NUMA home local real address as the global address for S-COMA caches, and translating the home local real address to a client local real address for execution of the coherence protocol on the client node. Likewise, for coherence messages moving from the client to the home, the client local real address is translated to a global address in the form of a home local real address before transmission into the network which connects the nodes.

In the standard S-COMA implementation, all nodes maintain S-COMA caches for referenced global data, even the data's home node. When a home node brings data into its local memory for use by client nodes, the home node must keep the data in its own S-COMA cache. This is necessary in order for the S-COMA apparatus to gain control over references to that data in order to perform the coherence management.

With this invention, S-COMA caches are only used to hold cached lines which are homed elsewhere. It is not necessary to cache lines in the S-COMA caches of the home nodes, because all coherence management is performed by the home NUMA apparatus; i.e., normal (non S-COMA) memory holds local lines, and the NUMA directory will track usage of lines homed at this node. When a coherence action is necessary, the standard NUMA mechanisms are used to send coherence messages to other nodes, and the line's home real address is sent.

The home real address is used in the same way as a global address on an S-COMA system. S-COMA client nodes will perform a "boundary function" translation on the addresses which are being passed in to and out of the node. This is similar to the translation that occurs with a standard S-COMA implementation, which translates between global addresses and local real addresses. However, in the hybrid implementation, the client translates directly between a home real address which is used by the home node, and a client real address which represents the S-COMA cache in the client's local real memory.

Figure 3:
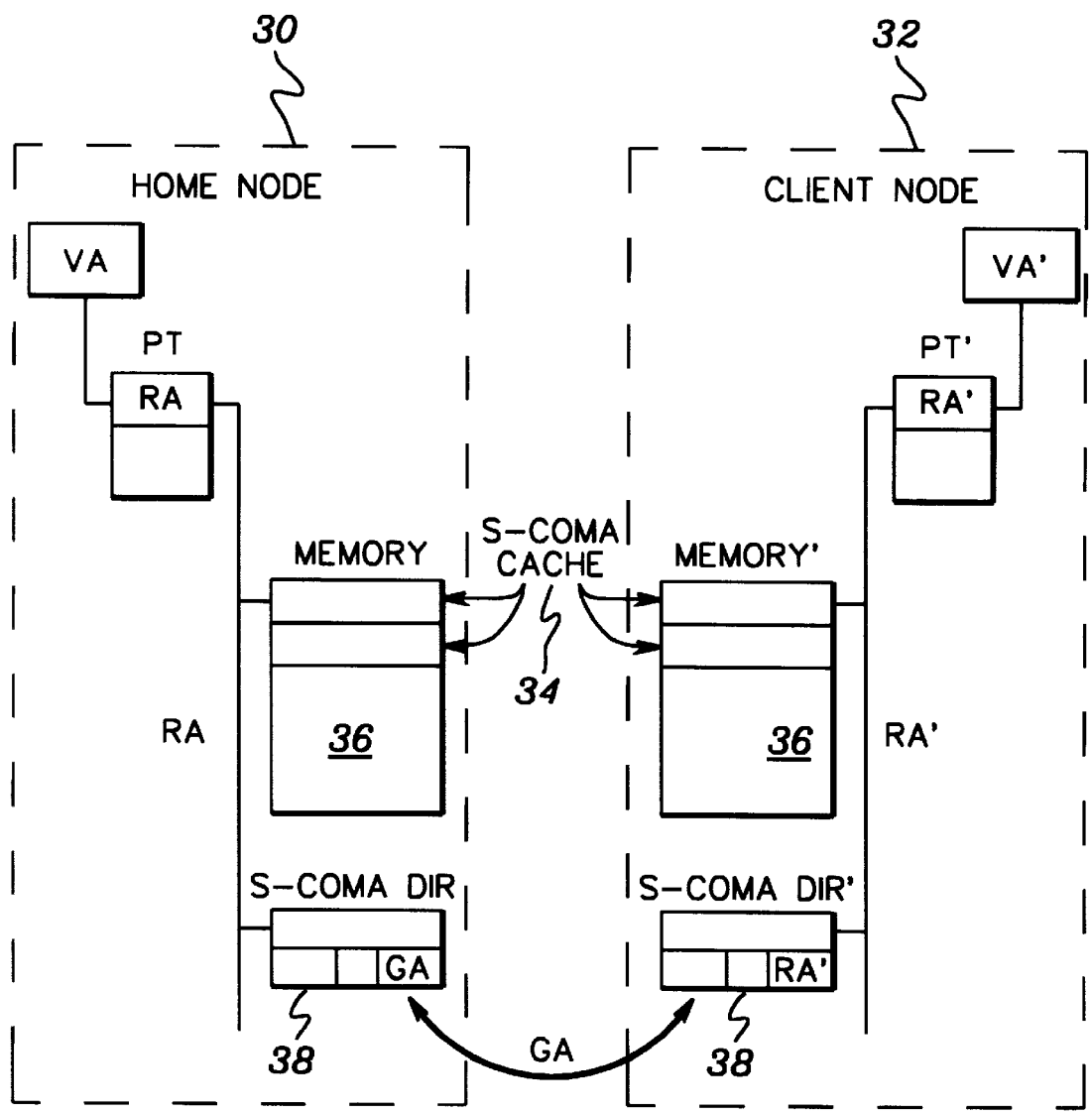
FIG. 3 depicts a general simple cache only memory architecture (S-COMA)
Figure 4:
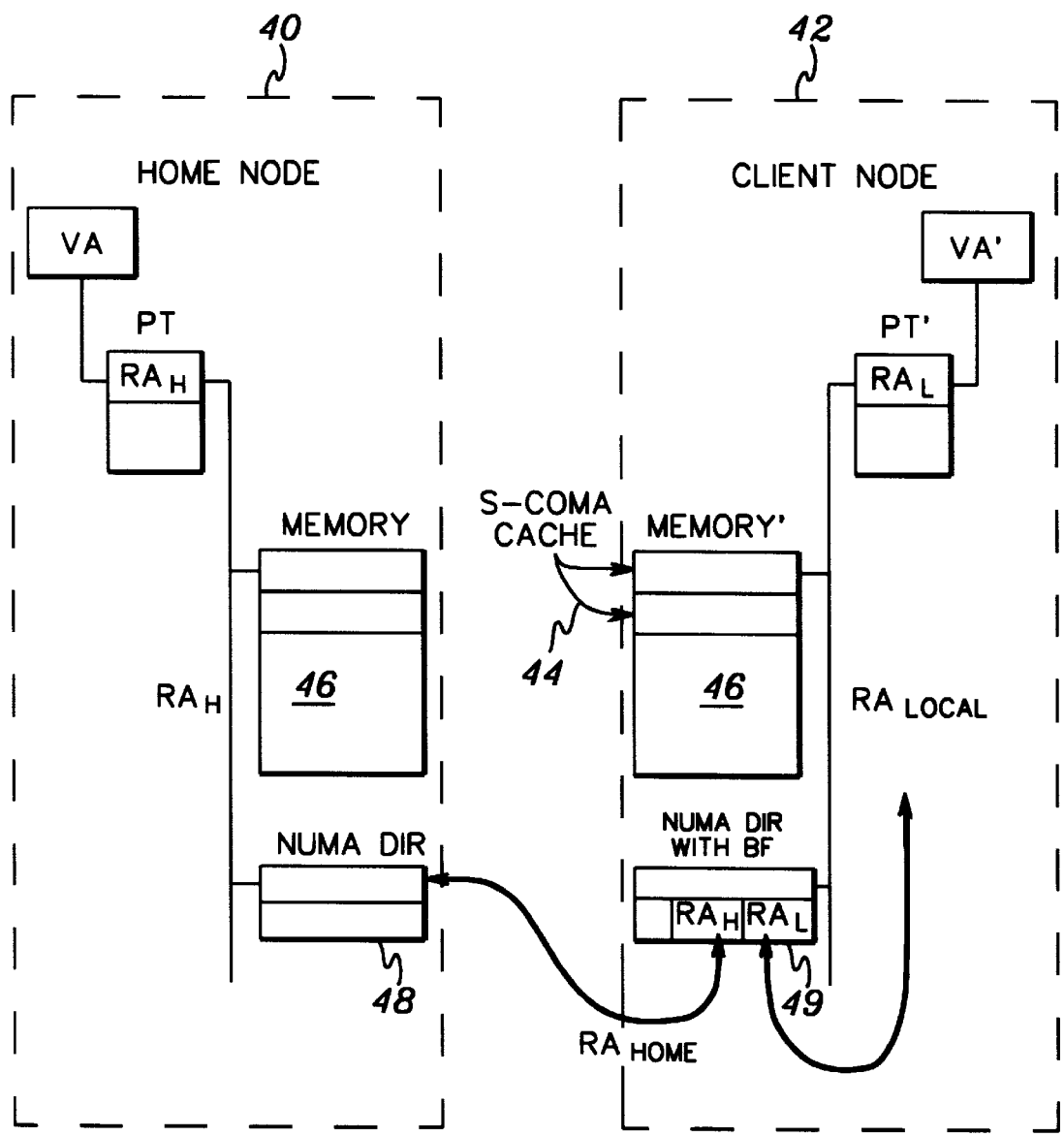
FIG. 4 is a high level depiction of a hybrid NUMA/S-COMA system implemented in accordance with the present invention.

FIG. 4 depicts one embodiment of the present invention illustrating the relationship between the various types of addresses for a hybrid NUMA/S-COMA environment as proposed herein. The environment includes a home node 40 and client node 42 each of which includes real addresses ($RA_H$) and ($RA_L$), respectively. As with FIG. 3, client node 42 maintains an S-COMA cache 44 in a local real address space 46 which is independent of home node 40. However, unlike the embodiment of FIG. 3, communication between home node 40 and client node 42 takes place not with a canonical global address, but with the real address used by the home node 40 ($RA_H$), or ($RA_{home}$) Client node 42 translates the received real address in NUMA director with boundary function 49 into a corresponding local real address ($RA_L$) or ($RA_{Local}$) which points to the client's S-COMA cache 44.

One aspect of the present invention is to translate from the NUMA address used on a system wide basis to a local address which applies only to the S-COMA cache on each node communicating with the home.

A global memory system, such as NUMA, utilizes an address space which is distributed among multiple nodes in a system. The address itself designates which node provides the backing memory for the data being addressed. For example, in a very simple system, the high order byte of an address might specify the node number, and the remainder of the address might specify the memory location within the node.

When a node receives a home address as input from another node, it can translate the address to some "associated address", i.e., a local address which corresponds directly to the home address, for further processing. The benefit of this is that the local node can manage its own addresses independently of the rest of the system, as with S-COMA. This is particularly important in a multiple operating system environment, where each node is running an independent operating system instance. Note that the term "each node" can also be substituted with "subset of nodes". For the sake of simplicity, the term "each node" is used henceforth, and understood to mean one node or a collection of nodes operating under control of a single operating system instance.

The address translation mechanism is referred to herein as the boundary function. On each client node, the boundary function maintains a directory for tracking memory addresses which require translation when being sent by or received by the node. This directory is accessible by the snooping logic (for local memory references) and by the network logic (for references from remote nodes). Each directory entry contains the local real address and the corresponding home node address of the line of interest. If a flag in the entry indicates that translation is required, then the input address is substituted with the "associated address" from the directory entry.

As per the S-COMA organization, a portion of main memory is used as a data cache for global memory. Each of these S-COMA caches are managed by the local node which uses them.

The NUMA mechanism will be used to provide data reference capture, data movement, and coherence mechanisms. This avoids the need for a separate S-COMA mechanism for data reference capture, data movement, or coherence. These aspects of the invention are itemized further below.

Figure 1:
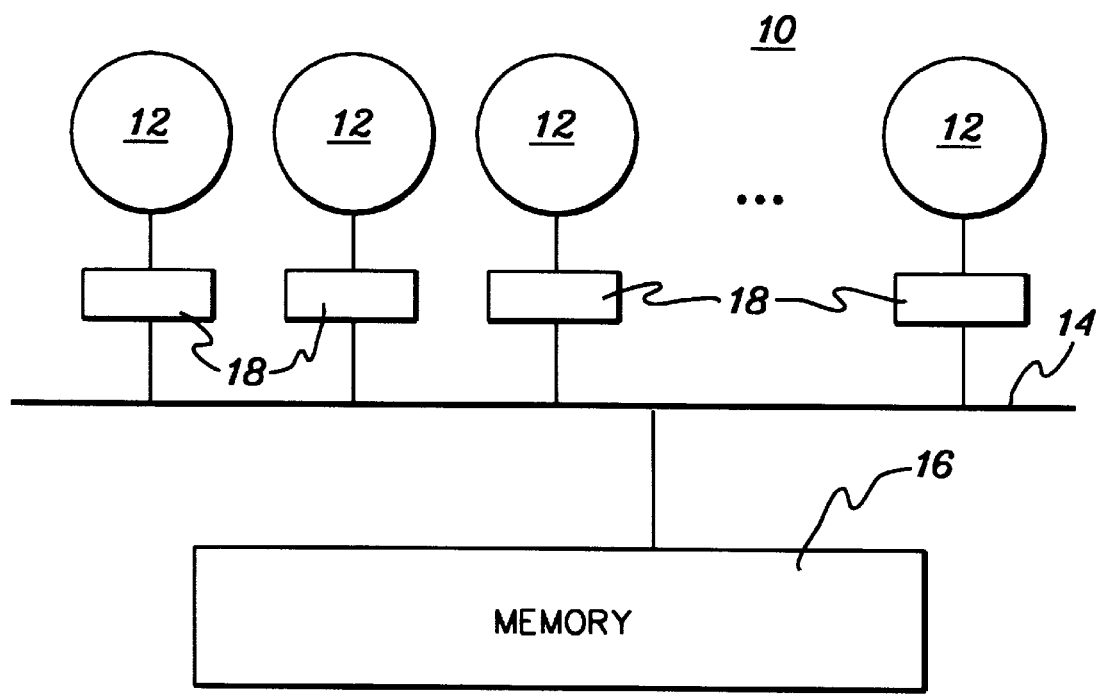
FIG. 1 is a diagram of one embodiment of a typical uniform memory access (UMA) architecture.
Figure 2:
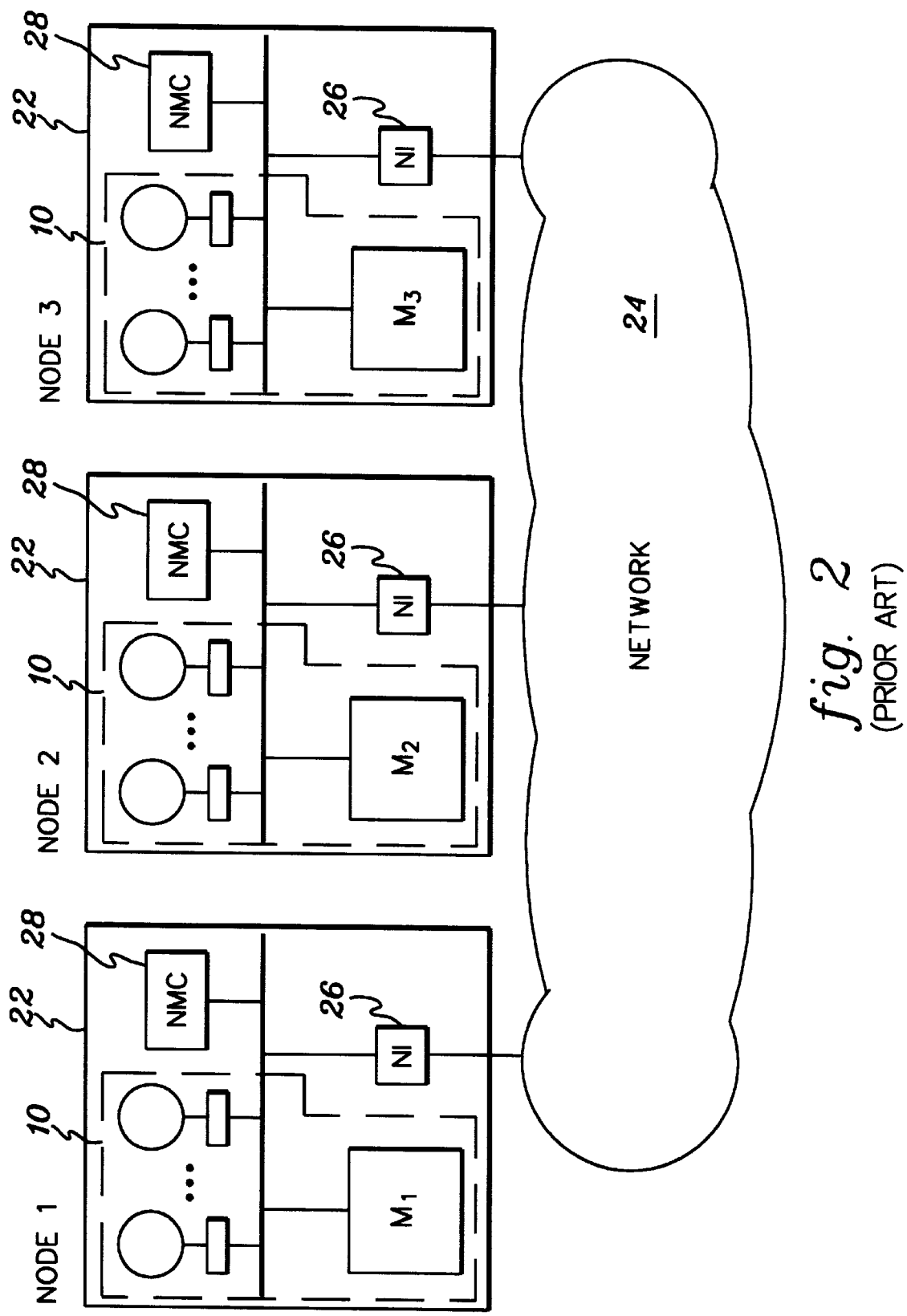
FIG. 2 is a diagram of one embodiment of a non-uniform memory access (NUMA) architecture.

1. The starting point is a NUMA system such as depicted in FIG. 2. In the NUMA system, the real address space of the system is distributed among the nodes, and is shared (i.e., any node can reference any memory location). A NUMA system contains an apparatus for maintaining coherence for each memory location, maintains a list of clients which cache a particular memory location, and routes coherence requests to the home or client memory locations.

2. Coherence directory: Each NMC keeps a table with one entry for each line of memory which is homed at this node. In each entry, there is a list of client nodes at which the line is being cached. This table is indexed by the real memory address.

3. System software allocates a portion of main memory on each node as an S-COMA cache.

4. Boundary Function Translation Table: Each NMC keeps a table with one entry for each page of memory which is being used as S-COMA cache. Each entry contains the home node real address ($RA_{home}$) of the cached data. This table is indexed by the local real memory address ($RA_{local}$). An entry can also be found by using the home real memory address as input and deriving the local real memory address, though this may be a less efficient lookup.

5. The NUMA memory subsystem treats all addresses in the range of the local S-COMA cache as addresses which are homed elsewhere. That is, the local NMC does not initiate coherence actions for addresses in the range of the local S-COMA cache. Instead, it performs a boundary function translation and forwards the memory request to the home of the home node real address ($RA_{home}$) corresponding to the target local real address in the Boundary Function Translation Table.

6. Each NMC only performs a BF Translation Table lookup for operations which are outbound from the node or inbound to the node, and then only for addresses for which it is not the home. This is known as the boundary function.

7. The data address in the outbound data is replaced with the "associated value" data address from the table.

When the client node references the data in its S-COMA cache via its local real address and the state in the local coherence directory indicates invalid, the local reference is stalled by the normal NUMA mechanism, the BF translates the local real address to the home node real address, and the request for data is sent to the home node by the normal NUMA mechanism. Note that the NUMA subsystem is able to route the request for the line because the Network Address is an actual NUMA address.

The home node, which does not perform any Boundary Function, receives the request and acts on it with standard NUMA logic. The requested data is sent back to the client node in a response message.

The client node receives the response for the requested data, and performs a BF lookup on the Network Address (i.e., the home node real address). Finding the $RA_{home}$ in the BF Translation Table, the BF replaces that address with corresponding local real address from the table. The memory controller marks the line as valid in the coherence directory, and forwards the data response to the requesting processor of the client node. This completes the request.

When the client references the data in its S-COMA cache via its local real address and the state is valid, the line is in its S-COMA cache and does not require further action. No BF translation is required, and the data is simply returned from local memory at local memory latencies by the normal NUMA mechanism.

When the home node sends out a coherence request to the client nodes, it does so using its own NUMA address (which is in place of the Global Address in a pure S-COMA system).

Each client node receives the request and the BF translates the incoming address (the home node real address) to the local address as found in the BF Translation Table. The request is then processed locally using the local address ($RA_{local}$)

FIGS. 5–9 depict one embodiment of logic flow implemented within a hybrid NUMA/S-COMA system in accordance with the present invention. In the discussion to follow the system of FIG. 4 is assumed, wherein a requesting processor comprises the client node, and a memory management unit (MMU) might comprise a NUMA memory controller (NMC) as described above. Further, the physical address (PA) is equivalent to a real address (RA) as described above.

Figure 5:
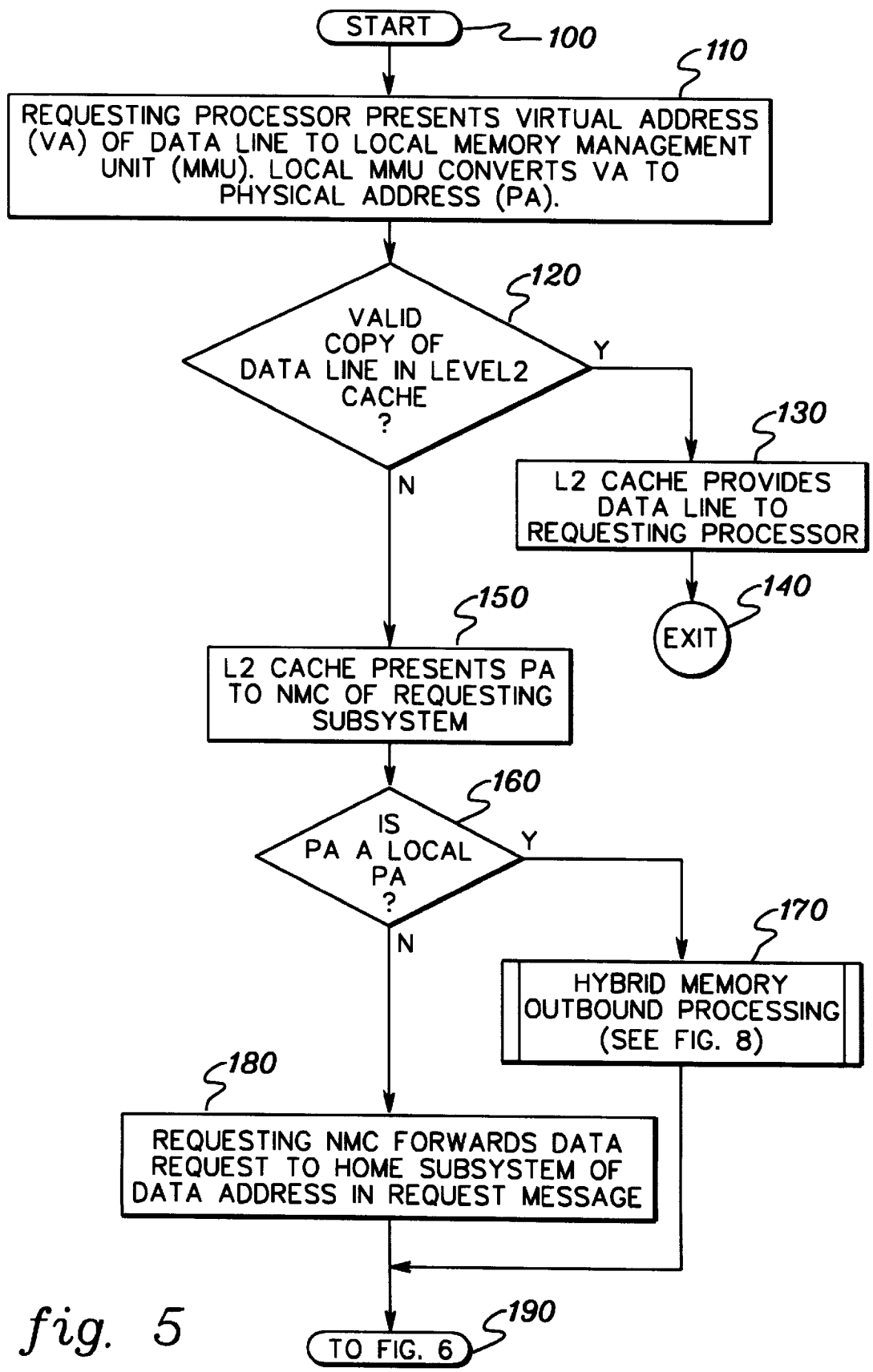
FIG. 5 is a flowchart of one embodiment of memory request logic implemented at a client node within a hybrid NUMA/S-COMA system in accordance with the present invention.

Beginning with FIG. 5, the logic flow is initiated 100 with a client node or requesting processor presenting a virtual address (VA) of a data line to its local memory management unit (MMU) 110. The local MMU converts the VA to a physical address (PA), and the logic determines whether there is a valid copy of the desired data line in one of the requesting processor's hardware caches 120. As used herein, the "level 2 cache" refers to a regular or standard cache, not an S-COMA cache, which is referenced further below. If the data is in the local standard cache, then the L2 cache provides the data line to the requesting processor 130, and the data retrieval process is completed 140.

Figure 8:
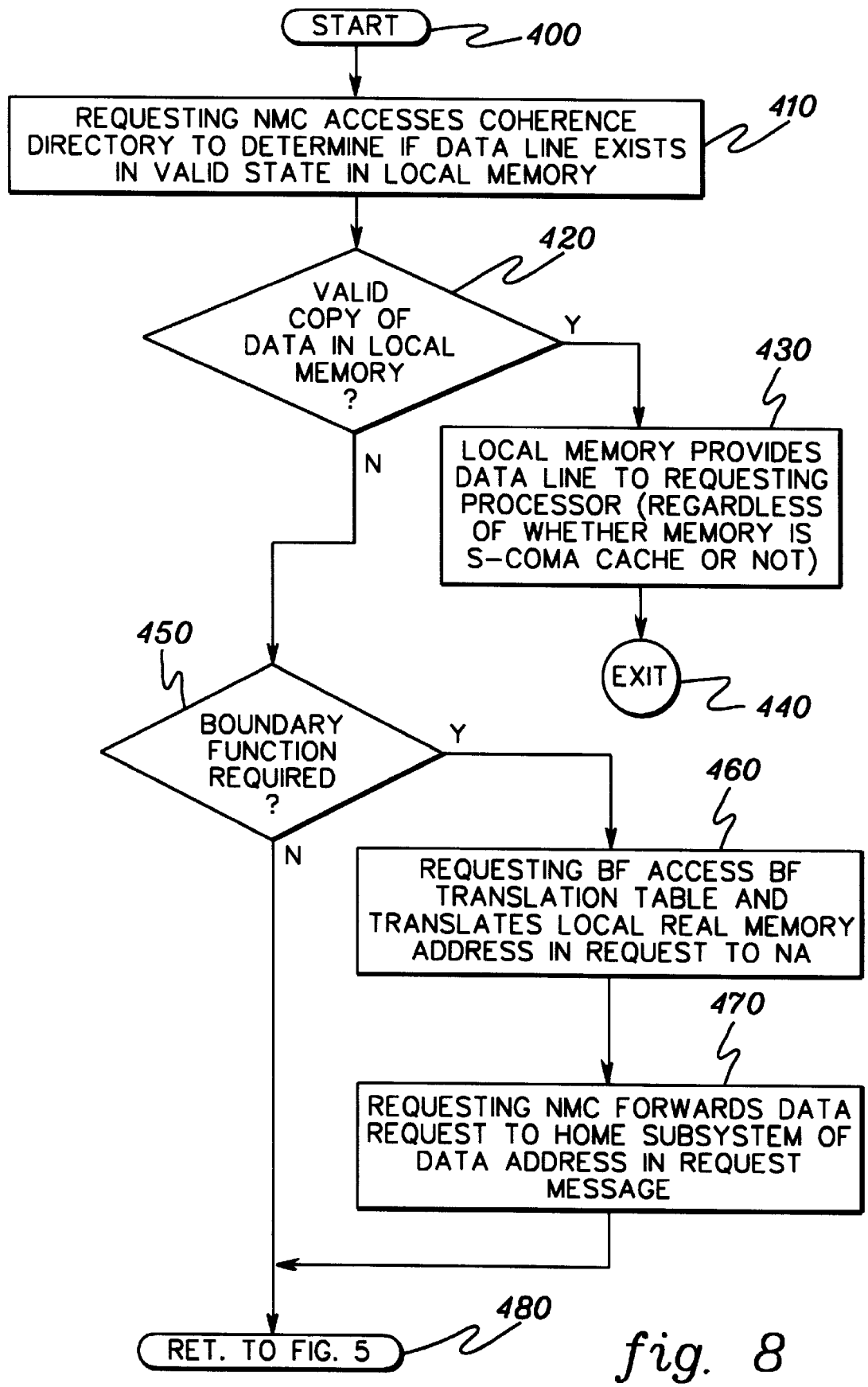
FIG. 8 is a flowchart of one embodiment of hybrid memory outbound processing logic at a home node in a hybrid NUMA/S-COMA system in accordance with the present invention.

If the physical data is not in one of the requester's hardware caches then the L2 cache presents the physical address (PA) to the NUMA memory controller (NMC) of the requesting subsystem 150, and inquiry is made at the NMC whether the physical address is a local physical address to the requesting processor 160. If "yes", then the hybrid memory outbound processing of FIG. 8 is employed 170, as described further below. Essentially, FIG. 8 logic determines whether the physical address is part of a local S-COMA cache at the requesting processor. If the physical address does not comprise a local physical address, then the data line is at a remote physical address and the logic resolves to a pure NUMA processing example wherein the requesting NMC forwards a data request to the home subsystem having the data address in the message request 180.

Figure 6:
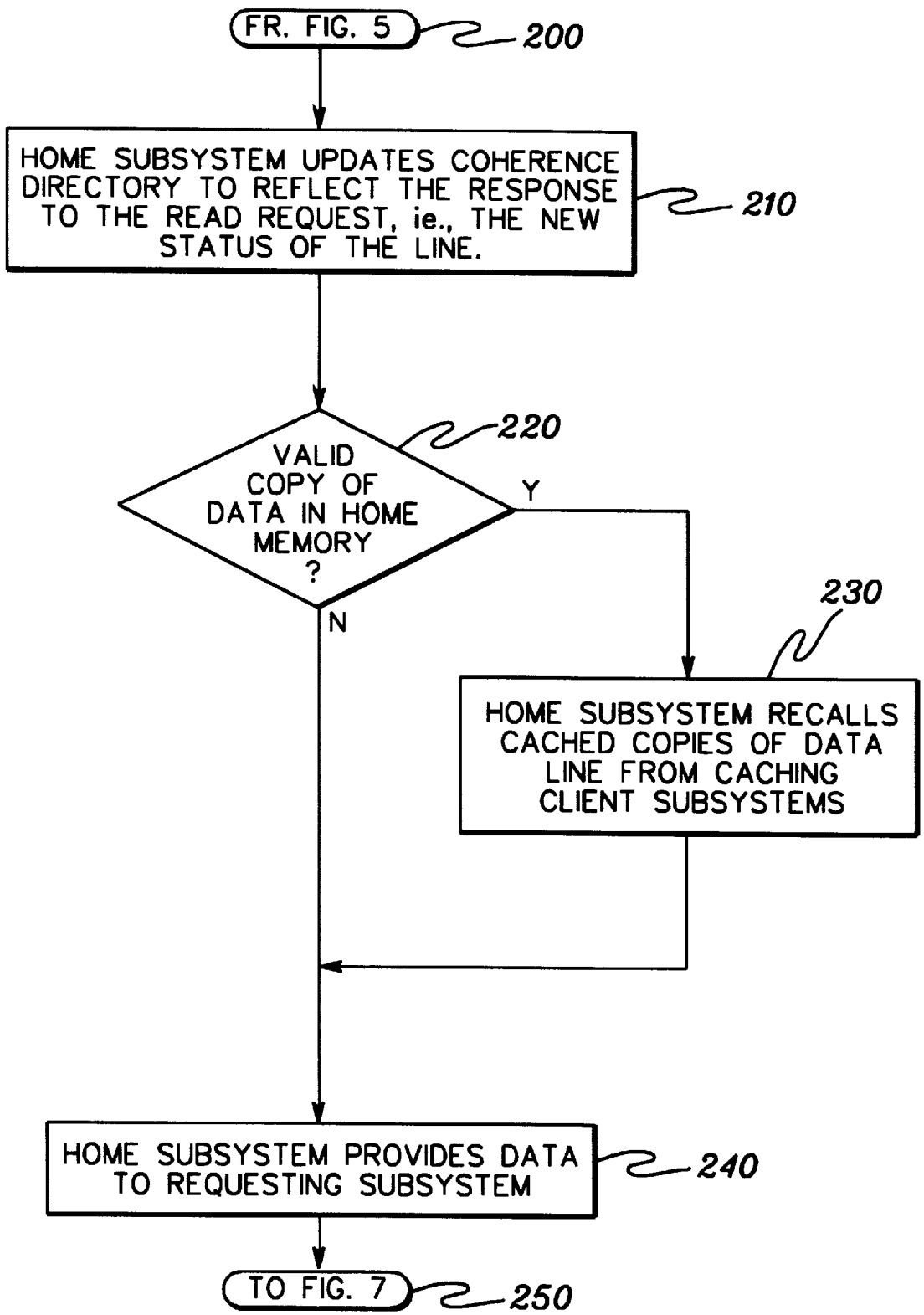
FIG. 6 is a flowchart of memory request logic implemented at a home node in a hybrid NUMA/S-COMA system in accordance with the present invention.

The logic transitions 190 from the request node to the home node processing of FIG. 6 200, where the home subsystem receives the request message and updates its coherence directory to reflect a response to the read request, i.e., the new status of the data line 210. The new status of the data line is representative of which processing node has a valid copy of the data line, which is conventional NUMA processing to track those client nodes which are caching the subject data line, as well as the state of the date line, i.e., valid or invalid. The home subsystem then determines whether it has a valid copy of the data in home memory 220, and if "no", conventional NUMA processing is employed by the home subsystem to recall cached copies of the data line from caching client subsystems 230. Once the home subsystem has a valid copy of the data line in memory, the data is provided to the requesting subsystem 240, and the logic transitions to the requesting subsystem for further processing as shown in FIG. 7 250.

Upon receipt of the returned data from the home subsystem, processing at the requesting subsystem begins 300 by determining whether the physical address received at the client node is a local physical address 310. If not, then the hybrid memory inbound processing of FIG. 9 310 is performed in accordance with the present invention.

Figure 9:
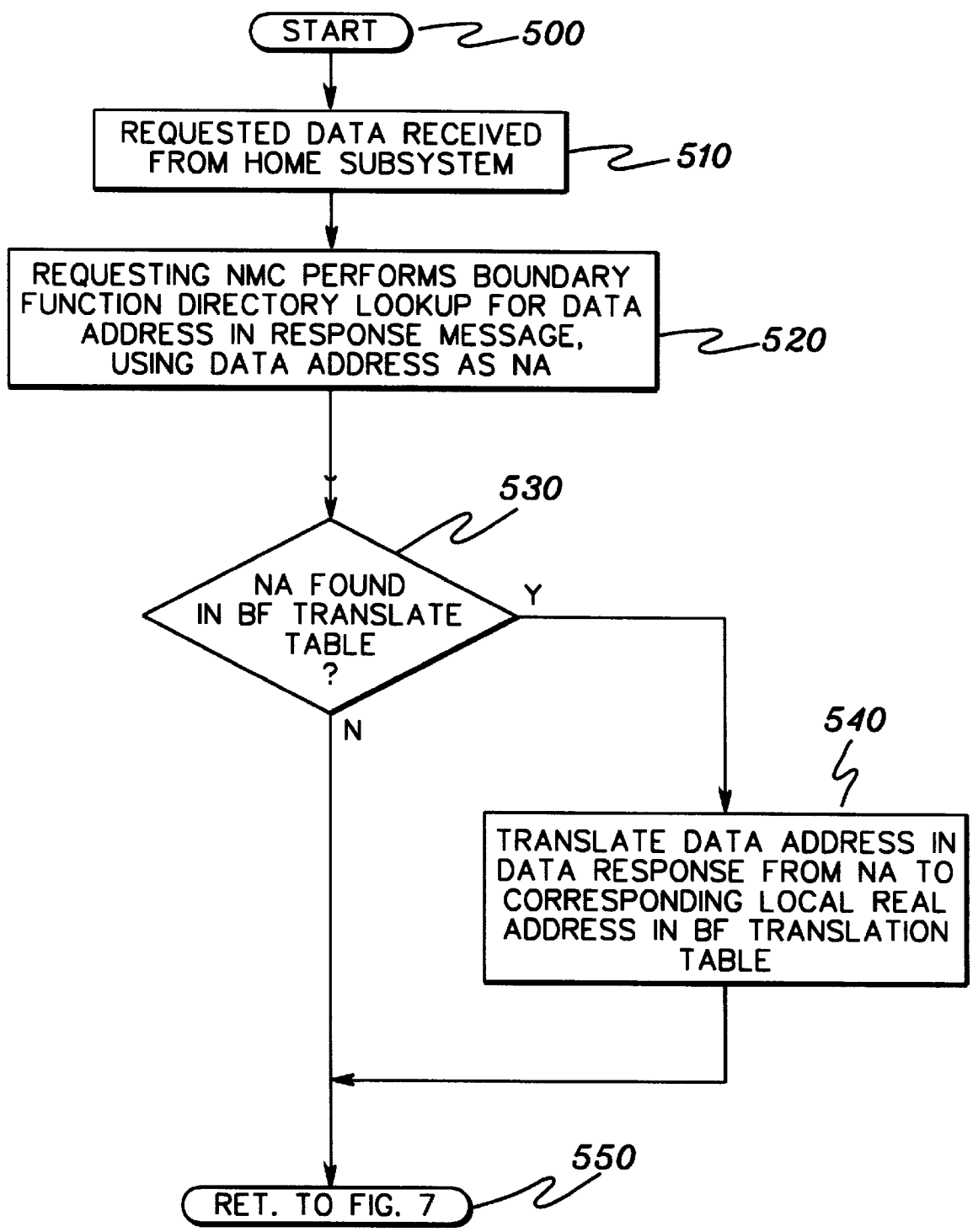
FIG. 9 is a flowchart of one embodiment of hybrid memory inbound processing logic at a requesting node of a hybrid NUMA/S-COMA system in accordance with the present invention.

As shown in FIG. 9, inbound processing begins 500 with the requested data being received at the requesting subsystem from the home subsystem 510. The requesting NMC then performs a boundary function directory lookup for the data address in the response message, using the received data address as a "network address" as described herein above 520. If the network address (NA) is found in the boundary function translate table 530, then the data address is translated from the network address to a corresponding local real address ($RA_{Local}$) in the boundary function translation table for use by the requesting subsystem 540. If the network address is not found in the translate table, or translation thereof has been performed pursuant to the boundary function, processing returns to the logic flow of FIG. 7 550.

Figure 7:
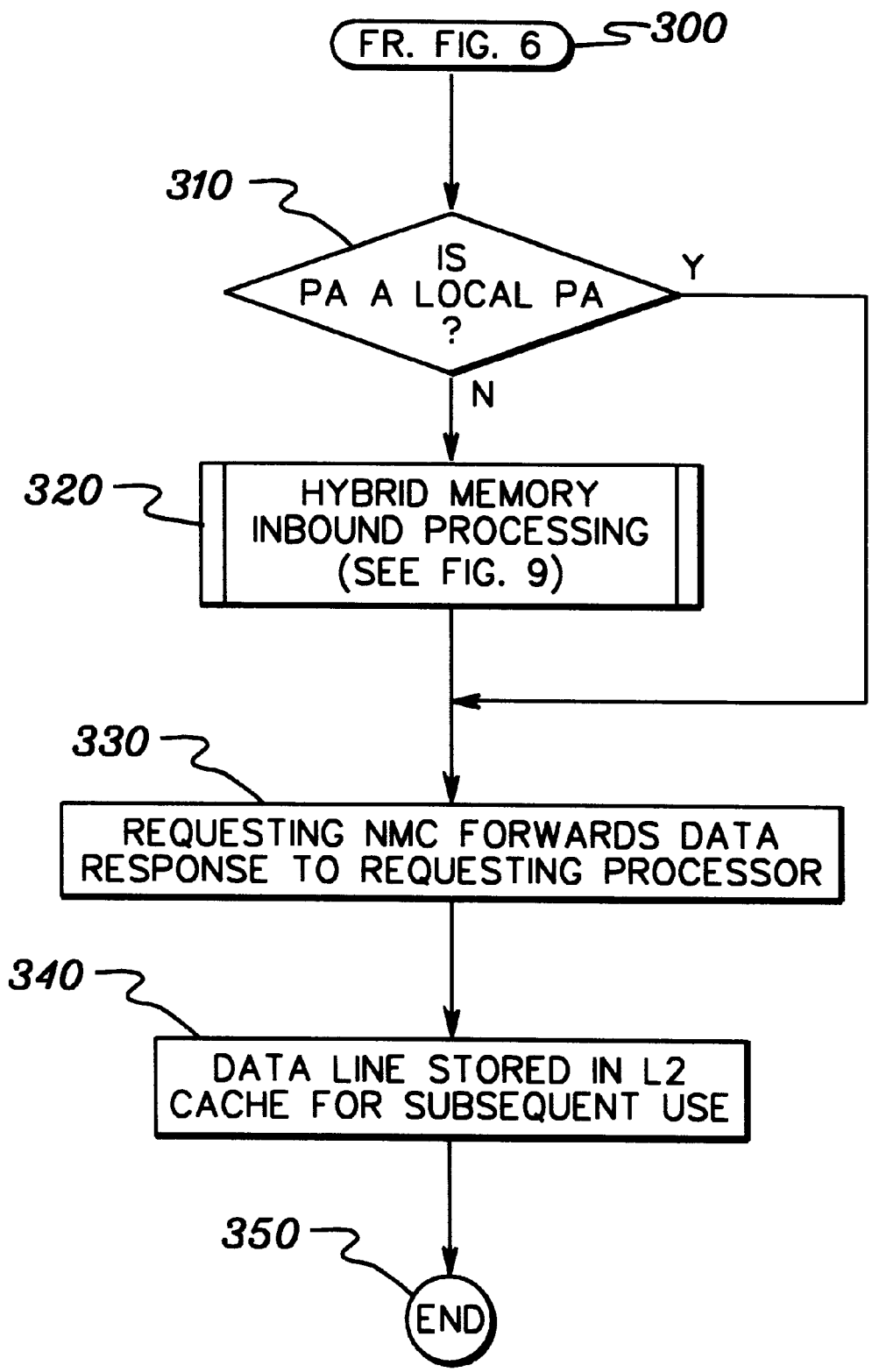
FIG. 7 is a flowchart of one embodiment of inbound memory request processing logic at the requesting node in a hybrid NUMA/S-COMA system in accordance with the present invention.

Continuing with the requesting subsystem processing of FIG. 7, if the physical address is a local physical address, 10 or after the hybrid memory inbound processing of FIG. 9, the requesting NMC forwards the data response to the requesting processor 330, and optionally, the data line is stored in the L2 cache (i.e., regular hardware cache) for subsequent use 340. This completes processing in accordance with this embodiment of the present invention 350.

Returning to FIG. 5, if the physical address is a local address, then from inquiry 160, the hybrid memory outbound processing of FIG. 8 is performed. This processing is commenced at the requesting subsystem 400 by the requesting NMC accessing the coherency directory to determine if the data line exists in a valid state in the requester's local memory 410. If the answer is "yes", then the local memory provides the data line to the requesting processor, regardless of whether the memory is S-COMA cache or not 430, thereby completing the retrieval processing 440.

If no valid copy of the data is in local memory, then logic determines whether a boundary function is required 450, i.e., by determining whether the requested address is in the S-COMA cache range. If "no", then this is not an S-COMA situation and the data has been checked out to another node of the system. If the address selected is part of an S-COMA cache, then the address must be translated to a home address which will be understood by the subsystem. Thus, the requesting boundary function accesses the boundary function translation table and translates the local real memory address in the request to a network address 460, which can then be forwarded to the home subsystem as described above 470, thereby completing the hybrid memory outband processing of FIG. 8 480.

To summarize, those skilled in the art will recognize from the above discussion that there are numerous advantages to a hybrid NUMA/S-COMA system as disclosed herein. Again, the system presented comprises a truly merged system wherein the need for a separate S-COMA coherence and communication apparatus is eliminated by employing the NUMA coherence and communication apparatus. As disclosed herein, the NUMA director is employed to move data and maintain internode coherence notwithstanding integration of the S-COMA function therewith. With the combined system as presented, the large, flexible, main memory caches of S-COMA are available, which provides extra caching capacity over a purely NUMA implementation for each node, without requiring the dedicated cache memory. Advantageously, translation between a global address and real addresses on a home node is avoided by the implementation presented.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A hybrid non-uniform memory architecture/simple cache-only-memory-architecture (NUMA/S-COMA) memory system useful in association with a computer system having a plurality of nodes coupled to each other, and wherein data is stored in said hybrid NUMA/S-COMA memory system as a plurality of pages, each said page including at least one data line, said hybrid NUMA/S-COMA memory system comprising:

a plurality of NUMA memories configured to store said at least one data line, each NUMA memory of said plurality of NUMA memories residing at a different node of said plurality of nodes of said computer system, and wherein said plurality of NUMA memories includes a NUMA coherence subsystem for coordinating transfer of data therebetween;

at least one S-COMA cache configured to store at least one of said plurality of pages, each S-COMA cache of said at least one S-COMA cache residing at a different node of said plurality of nodes or said computer system, and wherein said at least one S-COMA cache employs said NUMA coherence subsystem in sending data communication to or receiving data communication from another node of said plurality of nodes of the computer system;

wherein said at least one S-COMA cache comprises a plurality of S-COMA caches, and wherein said NUMA coherence subsystem includes a NUMA coherence protocol on a client node of said plurality of nodes caching data in one of said S-COMA caches from a home node of said plurality of nodes of said computer system, said NUMA coherence protocol being employed to send S-COMA coherence messages between said client node and said home node; and wherein said NUMA coherence subsystem with said coherence protocol at said client node comprises a boundary function translation table at said client node for transitioning between a home node real address and a client node real address when sending a message between said one S-COMA cache of said client node and said home node, wherein said home node real address comprises a network address employed by said NUMA coherence subsystem in transferring data between said home node and said S-COMA cache of said client node, and wherein said home node real address comprises a local physical address of the home node without need of translating between global addresses and real addresses on the home node.

2. The hybrid NUMA/S-COMA memory system of claim 1, further comprising a communication network connecting said plurality of nodes, and wherein said NUMA coherence subsystem includes means for employing said boundary function translation table for translating a client node real address to a home node real address comprising a network address for transmission onto said communication network interconnecting said plurality of nodes when communicating a message from said client node to said home node.

3. The hybrid NUMA/S-COMA memory system of claim 1, further comprising a communication network connecting said plurality of nodes, and wherein said NUMA coherence subsystem includes means for checking said boundary function translation table upon receipt of a network address at said client node and for converting said network address to a client node real address using said boundary function translation table when said network address is associated with a message from a home node to said one S-COMA cache of said client node, said network address comprising a home node real address.

4. The hybrid NUMA/S-COMA memory system of claim 1, wherein said at least one S-COMA cache includes an S-COMA cache implemented at at least one client node of said plurality of nodes to hold at least one cached page homed elsewhere in said computer system.

5. The hybrid NUMA/S-COMA memory system of claim 4, wherein said NUMA coherence subsystem is employed by said at least one S-COMA cache to send S-COMA coherence messages to other nodes of said plurality of nodes.

6. The hybrid NUMA/S-COMA memory system of claim 4, wherein said client node comprises means for storing data in said S-COMA cache at said client node without informing a home node of said storing decision.

7. The hybrid NUMA/S-COMA memory system of claim 6, wherein said client node and said home node have independent operating systems.

8. The hybrid NUMA/S-COMA memory system of claim 4, wherein said plurality of nodes of said computer system include multiple client nodes, each client node having an S-COMA cache and comprising means for managing said S-COMA cache, said means for managing comprising means for employing the NUMA coherence system for coherence management of said S-COMA cache.

9. A method for communicating data between a client node and a home node of a computer system having a plurality of nodes coupled to each other, wherein said computer system employs a hybrid non-uniform-memory architecture/simple-cache-only-memory-architecture (NUMA/S-COMA) memory system having a plurality of NUMA memories configured to store data, each NUMA memory residing at a different node of said computer system, and at least one S-COMA cache configured to store data, each S-COMA cache residing at a different node of said computer system, said client node including an S-COMA cache of said at least one S-COMA cache, said communication method comprising:

(i) generating at said client node of said plurality of nodes of said computer system a data request with a real address of memory;

(ii) determining whether said real address comprises a local real address at said client node;

(iii) when said real address comprises a local real address, determining whether a boundary function translation is required of said local real address to translate said local real address into a home node real address; and (iv) when said boundary function translation is required, translating said local real address into said home node real address, wherein said home node real address comprises a network address to be employed by said client node in requesting access to data at said home node real address, and wherein said home node real address comprises a local physical address of the home node of said plurality of nodes without need of translating between global addresses and real addresses on the home node.

10. The method of claim 9, wherein said local real address comprises an S-COMA cache address, and said method further comprises forwarding a request message from said client node to said home node using a NUMA coherence subsystem of said plurality of NUMA memories, said request message including said network address comprising said home node real address of requested data.

11. The method of claim 10, further comprising receiving a response message at said client node from said home node, said response message including a real address, and wherein said method further comprises determining whether said real address of said response message comprises a local real address of said client node.

12. The method of claim 11, wherein when said real address is other than a local real address at said client node, said method comprises performing at said client node a boundary function directory lookup for said real address in said response message, and if said real address is found in said boundary function directory lookup, translating said real address from the network address to a corresponding local real address using said boundary function translation table for said client node.

13. The method of claim 9, wherein said client node includes a NUMA memory controller, and wherein said method further comprises requesting said NUMA memory controller of said client node to forward said data request from said client node to said home node employing said network address comprising said home node real address.

14. The method of claim 9, wherein when said real address comprises other than a local real address in said determining (iii), said method further comprises requesting a NUMA memory controller at said client node to forward said data request to said home node employing said real address as a home node real address.

15. An article of manufacture, comprising:
at least one computer usable medium having computer readable program code means embodied therein for causing communicating of data between a client node and a home node of a computer system having a plurality of nodes coupled to each other, wherein said computer system employs a hybrid non-uniform-memory architecture/simple-cache-only-memory-architecture (NUMA/S-COMA) memory system having a plurality of NUMA memories configured to store data, each NUMA memory residing at a different node of said computer system, and at least one S-COMA cache configured to store data, each S-COMA cache residing at a different node of said computer system, said client node including an S-COMA cache of said at least one S-COMA cache, the computer readable program code means in the article of manufacture comprising:

(i) computer readable program code means for causing a computer to effect generating at said client node of said plurality of nodes a data request with a real address of memory;
(ii) computer readable program code means for causing a computer to effect determining whether said real address comprises a local real address at said client node;
(iii) computer readable program code means for causing a computer to effect determining whether a boundary function translation is required when said real address comprises a local real address, said boundary function translation translating said local real address into a home node real address; and
(iv) computer readable program code means for causing a computer to effect translating said local real address into said home node real address when said boundary function translation is required, wherein said home node real address comprises a network address to be employed by said client node in requesting access to data at said home node real address, and wherein said home node real address comprises a local physical address of the home node of said plurality of nodes without need of translating between global addresses and real addresses on the home node.

16. The article of manufacture of claim 15, wherein said local real address comprises an S-COMA cache address, and said article of manufacture further comprises computer readable program code means for causing a computer to effect forwarding a request message from said client node to said home node using a NUMA coherence subsystem of said plurality of NUMA memories, said request message including said network address comprising said home node real address of requested data.

17. The article of manufacture of claim 16, further comprising computer readable program code means for causing a computer to effect receiving a response message at said client node from said home node, said response message including a real address, and wherein said article of manufacture further comprises computer readable program code means for causing a computer to effect determining whether said real address of said response message comprises a local real address of said client node.

18. The article of manufacture of claim 17, wherein when said real address is other than a local real address at said client node, said article of manufacture comprises computer readable program code means for causing a computer to effect performing at said client node a boundary function directory lookup for said real address in said response message, and if said real address is found in said boundary function directory lookup, said article of manufacture further comprises computer readable program code means for causing a computer to effect translating said real address from the network address to a corresponding local real address using said boundary function translation table for said client node.

* * * * *